428-408. XR 2,804,401 SR dispersion coating

00403

Aug. 27, 1957 B. A. COUSINO 2,804,401

MAGNETIC SOUND TAPE

Filed April 11, 1955 2 Sheets-Sheet 1

Mylar

T428/323
X428/408
X428/480
X428/532
X429/100
X427/128

Bernard A. Cousino
INVENTOR.

BY McCoy, Greene & TeGrotenhuis
his attorneys

Aug. 27, 1957 B. A. COUSINO 2,804,401

MAGNETIC SOUND TAPE

Filed April 11, 1955 2 Sheets-Sheet 2

INVENTOR

Bernard A. Cousino

BY McCoy, Greene & Teeterline

ATTORNEYS

United States Patent Office 2,804,401
Patented Aug. 27, 1957

2,804,401

MAGNETIC SOUND TAPE

Bernard A. Cousino, Toledo, Ohio

Application April 11, 1955, Serial No. 500,403
9 Claims. (Cl. 117—138.8)

The present invention relates to magnetic sound tape and more particularly to an improved method for applying a graphite lubricant or the like to the tape.

This application is a continuation-in-part of my copending application Serial No. 342,684, filed March 16, 1953, and entitled, "Magnetic Sound Tape," now abandoned, and is also a continuation-in-part of my copending application Serial No. 459,313, filed September 30, 1954, and entitled "Endless Tape Reel For Magnetic Tape Recording and Reproduction", now abandoned.

One difficulty in high fidelity recording and reproduction from magnetic tape has been a "wow" or variation in tone. I have discovered that the variation may be due to a combination of factors including uneven tension, static electricity and adhesive or cohesive force between successive turns of the tape itself. Heretofore, dry graphite was rubbed against the side face of a magnetic sound tape to provide lubrication, but such a haphazard method of applying lubricant did not eliminate "wow" or variations in the speed of the tape over the magnetic recording and playback head due to variations in tension on the tape and did not provide a thin uniform graphite film or a continuous graphite film for effectively conducting electricity along the full length of the tape although the graphite coating improved somewhat as the tape was used due to continuous rubbing between convolutions of the tape if the tape did not fail prematurely. Such a haphazard method of applying graphite to the tape was therefor undesirable particularly where long tape lengths are employed or where high fidelity recording or reproduction was sought.

According to the present invention, a single- or double-coated magnetic sound tape is coated on at least one side thereof with a thin substantially uniform film or layer of finely-divided flaky electrically-conductive non-magnetic material, such as graphite or the like deposited from a liquid. Such film is continuous throughout the length of the tape so that a substantial electrostatic charge may not build up in the coil convolutions. The electrically conductive coating must be continuous to carry effectively static charges along the length of the tape and must be uniform and relatively smooth to permit sliding between adjacent convolutions of the tape coil.

To have the desired uniformity of draw or drag, the coating should not only be continuous and uniform but should also have other characteristics such as the lubricity of graphite, for it has been found that magnetic tape which has been vacuum coated with a non-magnetic conductive metal, such as aluminum, magnesium, zinc or the like, to form a thin uniform and continuous film on the tape does not provide the desired uniformity of drag or the long life of the tape needed in most recording and playback machines. Also, when graphite dust is merely rubbed on a magnetic tape, a uniformity is not obtained which is comparable to that obtained where the coating is deposited from liquid suspension which because of surface tension or liquid properties causes an overlapping or shingle like deposit of flakes.

It is preferable to employ a method of coating the tape wherein a uniform and continuous film is deposited on the surface of a magnetic tape from a substantially uniform dispersion in liquid of a flaky electrically conductive material, such as graphite or the like. Colloidal aluminum flake when deposited from liquid dispersion also provides a portion of the desirable results sought but conductive materials of this type are much inferior to graphite and are by no means the equivalent thereof in providing a tape with the desired performance characteristics.

Both the size and the deposition of the graphite particles is for some unknown reason important in obtaining a product of satisfactory performance. According to the method of this invention, minutely divided graphite particles or the like suspended in a liquid carrier are applied by brushing, spraying, or other suitable manner to one or both sides of a magnetic sound tape. Best results are obtained using colloidal particles suspended in a highly volatile liquid or a liquefied gas. Flocculation, agglomeration or bunching of the colloidal or semi-colloidal graphite particles in the dispersion may be prevented by the use of suitable dispersing agents, by maintaining the solution alkaline, or in any other suitable manner.

An object of the present invention is to provide a magnetic tape which operates efficiently in a magnetic sound recording and/or reproducing device for a maximum period of time with a minimum amount of "wow" and which is suitable for high-fidelity machines.

A further object of the invention is to provide a coating for a sound tape which effectively conducts static electricity along its length to prevent the buildup of a substantial static charge.

A still further object of the invention is to provide a coating for a magnetic sound tape which serves as a lubricant to reduce friction between convolutions of an endless tape coil.

Another object of this invention is to provide a simple and efficient method for coating tape with minutely divided graphite.

Another object of the invention is to provide a treatment for magnetic tape which prolongs the useful life of the tape subjected to normal operating conditions and reduces the tendency of such tape to tangle or stick during its operation.

Other objects, uses and advantages of the present invention will become apparent to those skilled in the art from the following description and claims, and from the drawings, in which:

Figure 1 is a top plan view of a typical recording and/or reproducing device herein shown as incorporating a form of endless tape arrangement (disclosed in my copending abandoned application Serial No. 324,449, filed December 6, 1952, and entitled, "Sound Tape Reel" and in my copending continuation-in-part application Serial No. 631,199, filed December 28, 1956), which type is enhanced by the invention herein;

Figure 1:
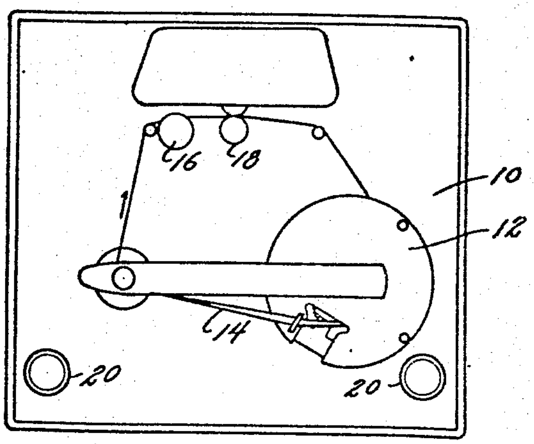

Referring more particularly to the drawings, in which like parts are identified with the same numerals throughout the several views, Fig. 1 shows a typical recording and reproducing mechanism 10 employing an endless magnetic sound tape 14, said mechanism being of the type shown in my copending application Serial No. 535,-899, filed September 22, 1955. A reel 12 of the type disclosed in the aforesaid copending application Serial No. 535,899 is mounted for rotation on the machine 10 and contains the major portion of the tape 14 in a spirally wound coil having concentric cylindrical convolutions. The tape travels from the innermost convolution of the coil to the magnetic transducer head 16 and back to the outermost convolution of the coil, suitable guides being provided to position the tape as it travels to and from the reel 12. Suitable feed rollers or driving members 18 engage the opposite faces of the tape as the tape moves away from the pick-up head 16 to pull the tape from the reel and to maintain a small tension on the tape engaging the head 16. The recording and playback unit 10 is provided with conventional control knobs 20 to control volume, speed and/or other functions of the machine.

Since the contacting convolutions of the endless tape coil slide with respect to each other as portions of the tape move from the outer to the inner convolution of the tape coil, there is substantial frictional resistance to movement of the tape and it is necessary to lubricate the tape to obtain efficient operation. In order to avoid binding of the tape, the buildup of a substantial static charge on the moving tape must be prevented.

Most magnetic recording tape comprises a thin flexible plastic ribbon or base coated on one or both sides with a magnetic material such as iron oxide particles or the like. The magnetic particles may be bonded or cemented to the tape through the use of various types of materials, as for example described in U. S. Patent No. 2,607,710, issued August 19, 1952. Since such particles normally provide the tape surface with a high coefficient of friction, lubrication of the tape is necessary to avoid wearing of the magnetic head and other tape engaging parts and to obtain a smooth even flow of tape necessary for high fidelity recording or reproducing. In endless tape reels containing a few hundred feet of magnetic sound tape, lubrication of the tape and elimination of static charges which bind the tape are essential for high fidelity operation for substantial periods of time. Test of tape treated according to the method of the present invention indicates that endless tapes of substantial length can be operated continuously for more than 250 hours without binding of the tape and without any appreciable, if any, decrease in the quality of the sound reproduction. The present invention makes practical the use of spirally wound coils of tape containing more than six hundred feet of tape and permits high fidelity recording and reproducing with very large endless tape coils.

I have found that, when the tape is provided with a coating deposited from liquid of graphite which has a fine enough particle size so as to be suspended in liquid, the tape has surprisingly superior performance characteristics. Although the reason therefor is somewhat uncertain, the fineness of the particle size of the graphite is extremely important. The graphite coating facilitates operation of the tape at a uniform rate of speed and for a maximum period of time with a minimum amount of friction. The coating should be continuous throughout the length of the tape and should be fairly uniform so as to provide an effective conduit for the flow of electrons along the length of the tape. Although it might seem that flakes of a relatively large particle size would provide more overlapping, better lubrication, and better conductivity; the smaller particles on the tape are found to provide superior operating characteristics due to the more uniform and continuous coating and the ability of the smaller particles of graphite to adhere strongly to the tape without any binder.

Heretofore attempts have also been made to lubricate tape for continuous operation by sprinkling graphite powder over the surface of the tape coil, but this method did not give the satisfactory performance of tape prepared in accordance with the present invention. Running of the tape through the mechanism ultimately wiped the greatest part of the graphite powder off the tape and the tape still failed in a comparatively short time. The method also had the disadvantage that large amounts of graphite collected in the mechanism. Also the coating on the tape was not uniform and was not continuous so as to provide an effective path for the flow of electrons. Apparently the small particle size of suspended graphite is required to provide a cohesive force which is greater than the wiping force that can be applied to the particle.

As above mentioned the preferred coating for a magnetic tape is an extremely thin film of graphite particles of colloidal size which is uniform and continuous and which has a very low resistance to the flow of electrons along the length of the tape. The film provides the most effective coating when the graphite particles are arranged in a shingle-like formation characteristic of a film deposited from a liquid in which the graphite is suspended but preferably in the substantial absence of a film-forming or resinous binder which could insulate or adhere the separate particles together or to the tape surface. The deposit of the particles of graphite or other material from a volatile liquid is advantageous since the resulting dried film is more uniform and more continuous, particularly where the particles are evenly dispersed in the liquid. Colloidal particles deposited from solution also tend to stick to the tape better than particles applied in the dry state and tend to form a shingle-like film most suitable for conducting electric charges along the tape. The ball mill grinding of graphite for long periods in water or liquid preferably containing an emulsifying agent or dispersing agent and various other methods for obtaining colloidal graphite suspensions are known in the art.

Figure 2:
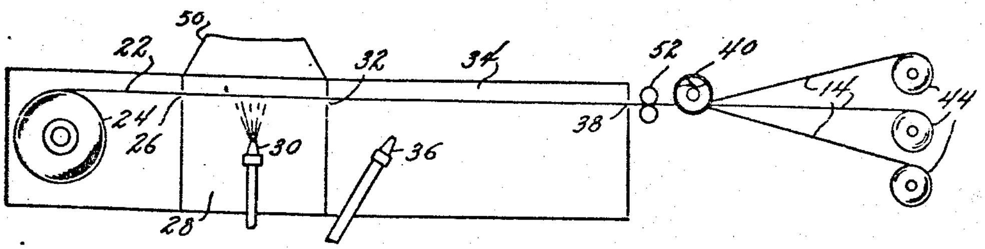
Figure 2 is a diagrammatic view showing a system for producing the coated magnetic tape of the present invention.
Figure 3:
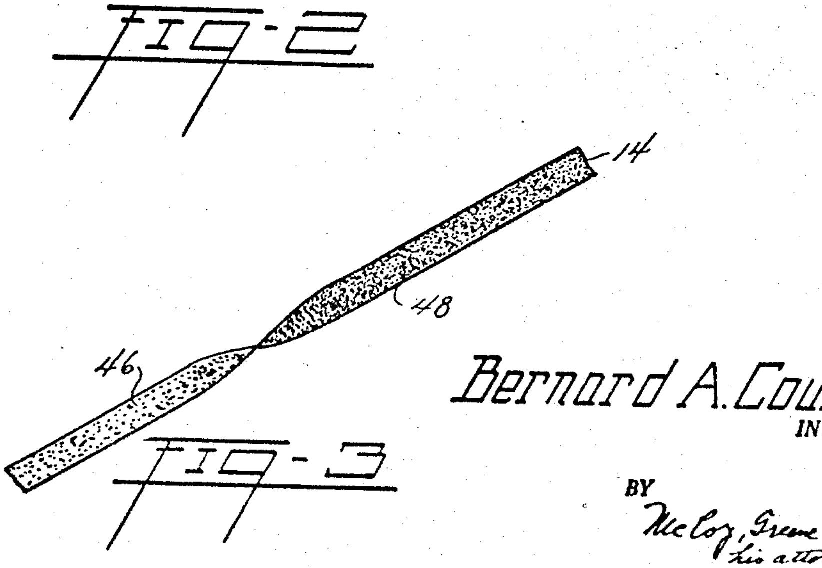
Figure 3 is a fragmentary top view showing a portion of the tape embodying the invention.

The liquid carrier in which the particles of graphite or other material are dispersed may be applied to the tape in various ways, for example by dipping or spraying or by employing rollers or a stylus or doctor blade to apply the liquid to the tape. Dipping is a relatively simple process wherein the tape is run through a bath of the solution, but this necessitates the coating of both sides of the tape. Roller coating consists of wetting the surface of the tape by the use of a roller whose surface is wetted with the solution and rubs against the tape. The stylus method of coating comprises the use of a wick, a fine-slit-type stylus, a brush, or the like through which the solution flows to the surface of the tape. Spray coating may be accomplished by the use of a nozzle or the like directed against the tape surface, for example, as illustrated in Fig. 2 of the drawings. When the tape is sprayed with a liquid carrier containing graphite particles, it is preferable to employ a highly volatile liquid carrier (such, for example, as isopropyl alcohol or the like) so that the tape can be dried in a minimum period of time. However, less volatile liquids may be preferred when the carrier is applied to the tape by means of rollers.

The liquid carrier may be one of various organic or inorganic liquids. The selection of the carrier depends upon the type of tape, the method employed to coat the tape, and the type of magnetic coating on the tape. Such carrier must be of a type which does not damage the tape. The liquid carrier is preferably highly volatile and is preferably non-inflammable; but any liquid which is capable of being completely evaporated without damaging the tape may be used including water; and any liquids, such as gasoline or the like, which are undesirable because of their inflammability may be used if precautions are taken to prevent fire or explosion. Where the liquid carrier is applied to the magnetic-coated side of the tape, such carrier is of a type which will not react with the iron oxide or other magnetic material on the tape and which will not substantially dissolve or damage the binder holding the magnetic material to the tape.

Depending on the type of tape employed, the liquid carrier may, for example, be a volatile non-inflammable liquid, such as Freon, Fluron or the like, or a volatile inflammable liquid such as gasoline. The liquid may also be water or other aqueous liquid, but more volatile liquids such as carbon tetrachloride, acetone or other ketone, isopropyl alcohol, or the like give better results. Other things being equal, the cheaper, more volatile, less toxic, and less inflammable liquids are preferred. Aliphatic liquids are usually preferred over the more toxic aromatic hydrocarbons.

The magnetic sound tape may consist of various flexible non-magnetic materials such, for example, as cellulose nitrate, cellulose acetate, cellulose butyrate, polyvinyl chloride, or the like. The most important of these is cellulose acetate which is used extensively for the manufacture of magnetic tape ribbons. A tape of highest quality can be made of "Mylar (polyethylene terephthalate oriented by stretching in two substantially perpendicular directions and having a molecular weight sufficiently high to show a characteristic crystal X-ray diffraction pattern when stretched).

Since graphite particles of collodial size deposited on a tape from solution according to the method of the present invention strongly adhere to the tape and have not sufficient size to readily rub off the tape, it is unnecessary and generally undesirable to use a binder to attach the graphite particles to the tape. However, the present invention provides an excellent method by which the particles of non-magnetic conductive material deposited on the tape from the liquid carrier may be firmly bonded or attached to the surface of the tape. According to this method the liquid carrier incorporates a solvent which provides a sticky or tacky surface on the plastic tape ribbon. The liquid carrier in which the minute non-magnetic electrically-conductive particles such as graphite are suspended may be selected so as to be a solvent for the plastic ribbon to be sprayed so that the carrier produces a tacky surface on the ribbon and the particles of graphite or other non-magnetic coating material stick to the tape. Thus, when cellulose acetate or cellulose butyrate tape is being treated, the liquid carrier may be a solvent such as acetone, dioxan or the like, which may easily be evaporated. When such carrier is evaporated, the particles of graphite or other material adhere to the tacky surface of the tape produced by the solvent and are firmly bonded to or attached to the plastic tape. Such solvent may be selected from liquids which do not damage the binder used to attach the magnetic oxide to the tape or may be applied to the non-magnetic side only of the tape so as not to contact said binder.

Of course, the amount of solvent action can be predetermined so that an excessive amount of tape is not dissolved, for example by determining the time of exposure to the solvent and the strength or amount of solvent in the carrier or by controlling the spraying and drying in any other suitable manner.

In order to retain the small particle size and to insure the proper dispersion of the non-magnetic conductive particles in the liquid carrier, a dispersing agent or anti-agglomerating agent may be employed in the liquid carrier. The type of dispersing agent depends on the type of carrier employed and must not render the carrier unsuitable for its intended purpose. Where the carrier is an organic liquid, the anti-agglomerating agent may, for example, be Gilsonite; a water-insoluble metal soap such as zinc stearate or the like; an oil-soluble napthenate such as zinc naphthenate or the like; a water-insoluble rosinate such as zinc rosinate or the like; a lecithin such as oil-soluble soya lecithin or the like; Sun Oil Company's EE Lengthener (ink lengthener), which is believed to be obtained by the sulfonation of an oil distillation residue; a long-chain or oil-soluble amine compound such as "Nopco CVT" (a product of National Oil Products Company); or a long-chain fatty acid amide such as stearylamide and derivatives thereof. Where the carrier is an aqueous liquid, a different type of anti-agglomerating agent may be used, such for example as quebracho, tannin, "Daxad" (a condensation product of formaldehyde and naphthalene sulfonic acids, etc.), water-soluble lignum sulfonates such as sodium lignum sulfonate (waste sulfite liquor residue), and other water-soluble agents recognized to have dispersing properties in aqueous solution and which are highly effective in producing dispersions in water. With alkaline or neutral systems the above-mentioned lecithins, fatty acid amides, and certain water-insoluble soaps may be preferred. Examples of various wetting agents or dispersing agents which may be used in the liquid carrier employed in the method of this invention are set forth in the lists of surface active agents starting on page 17, vol. 33, (January, 1941), and on page 127, vol. 3 (January, 1943), of "Industrial & Engineering Chemistry."

The suitability of a dispersing agent or anti-agglomerating agent depends on the type of tape employed, the type of liquid carrier, and how and where the carrier is applied to the tape, but the suitability may usually be determined experimentally by forming a heavy buttery paste of graphite and a suitable liquid carrier. The carrier for the test may be gasoline, keosene or the like for convenience if the dispersing agent tested is to be used with organic liquid carriers and may be water if the dispersing agent is to be used with aqueous liquid carriers.

The paste is spread under substantially non-drying conditions on a clean glass plate and separate portions of the paste worked respectively with and without the addition of small amounts of the agent whose dispersing or anti-agglomerating qualities are being considered.

Materials which are effective as graphite dispersing agents cause a marked decrease or break in the viscosity of the buttery paste to which they are added and cause the paste to become a creamy fluid when the paste is strongly worked, whereas no noticeable decrease in viscosity of the paste containing no addition is had.

Any of the various materials or mixtures which do not render the liquid carrier unsuitable and do not damage the tape and which decrease the viscosity of the paste in the above test may be used as a dispersing agent in the method of the present invention.

It will be understood that the terms "anti-agglomerating agent" and "graphite dispersing agent" as used herein designate such compounds or mixtures which cause a substantial change in viscosity in the above-described test procedure.

The above-mentioned anti-agglomerating agents prevent bunching or flocculation of graphite particles due to electrostatic charges. It is sometimes necessary that the liquid carrier containing a graphite dispersing agent be maintained neutral or slightly alkaline, for example, by the use of ammonium hydroxide or the like, to prevent agglomeration of graphite particles, but this is not the case where acid dispersing agents are used.

It is often desirable to employ a wetting agent in the liquid carrier particularly if water or other aqueous liquid is employed as the carrier. Any of the wetting agents listed in the above-mentioned lists of surface active agents in "Industrial & Engineering Chemistry" might be suitable for this purpose. The wetting agents may, for example, be a water-soluble soap such as triethanolamine oleate, stearate or palmitate, sodium oleate, sodium stearate or the like.

Figure 2 illustrates the preferred method of applying the non-magnetic lubricant coating to the magnetic tape wherein the volatile liquid carrier is sprayed onto the tape. As shown in that figure, a sheet or strip of plastic 22 of uniform width and thickness is drawn from a supply roll 24 through an opening 26 into a closed spraying chamber 28. The sheet is coated on one side only throughout its width and length with iron oxide or other suitable magnetic material that is attached to the sheet by a suitable binder. for example, as disclosed in U. S. Patent No. 2,607,710, issued August 19, 1952. A spray head or nozzle 30 is provided in the chamber 28 to direct the liquid carrier against the uncoated face of the sheet 22 opposite the magnetic-coated face thereof so as to coat the entire face of the sheet as it passes said nozzle. Any excess of spray may escape from the chamber 28 through a suitable flue 50. After the application of the liquid carrier to the tape in the chamber 28, the sheet 22 passes by way of an opening 32 into a closed drying chamber 34 having a length sufficient to thoroughly dry the sheet 22. The chamber 34 is provided with a conditioned atmosphere through a nozzle 36 or the like which may be maintained at any desired temperature and which may, if desired, be maintained with a low humidity for rapid drying. If the volatility of the liquid carrier is relatively low, the chamber 34 may be supplied with hot gases or otherwise heated to accelerate evaporation of the liquid provided that such heat does not damage the tape. After the tape is dried in the drying chamber 34, it passes by way of an opening 38 to a slitter mechanism 40 wherein the sheet 22 is slit longitudinally to form a plurality of plastic tapes or ribbons 14 of a predetermined uniform width which are then spirally wound onto rolls or reels 44 for commercial distribution. The sheet 22 is drawn through the chambers 28 and 34 by suitable driving rollers 52 at a constant speed so that the coating of graphite is continuous and uniform. The exposed side of the tape may be coated with an extremely thin haze or film in the spraying chamber 28, and the liquid carrier may be quickly evaporated in the drying chamber 34 to leave the tape with a minimum thickness layer of graphite.

As herein shown, the sheet 22 carries a magnetic coating 46 of iron oxide or the like which is directed away from the spray nozzle 30 as it passes through the chamber 28, so that the opposite or uncoated side of the sheet is covered with a non-magnetic coating 48 as supplied from the spray nozzle 30, any excess of spray escaping through the flue 50. By this method of application the liquid carrier does not contact the magnetic-coated face of the tape at 46. Such a method permits the use of a carrier which is a solvent for the binder used in the coating 46 or which might damage the magnetic coating on the tape if applied directly thereto.

However, it will be understood that, where the liquid carrier is selected so that it cannot damage the magnetic coating, the magnetic-coated side of the tape may also be sprayed or otherwise coated with the liquid carrier containing the graphite or other finely divided particles. Where fine colloidal graphite is deposited as a thin uniform and continuous non-magnetic film over the iron oxide coating of the tape, the value of the recording surface is not reduced substantially. However, the recording surface is more effective if the graphite film has a minimum thickness. Where the magnetic-coated face of the single-coated tape is not sprayed with graphite and the uncoated face only of the tape is sprayed, minute quantities of graphite will be transferred by rubbing from the sprayed non-magnetic face to the magnetic coated face of the tape to lubricate said latter face, but this in no way detracts from the value of the recording surface. In fact it has been found that after the tape is in operation for a substantial period of time it flows more freely through the desired cycle of movements and the graphite coating becomes smoother, more continuous, and better able to conduct static electricity along its length. Where a double-coated tape is employed, either one or both magnetic-coated faces of the tape may be sprayed with graphite to obtain the needed lubrication and electrical conductivity.

Treating of the tape with graphite in the manner described above not only reduces the tendency of the tape to stick or bind in an endless tape reel but also results in a smoother and more uniform tape feed and less wear on the magnetic recording and playback head. Even where the graphite is sprayed on the smooth or uncoated face only of the magnetic sound tape opposite the magnetic-coated face, the friction between the magnetic head and the magnetic-coated face of the tape is substantially reduced since the graphite lubricant is transferred by rubbing in the coil from the sprayed surface to the magnetic-coated surface and then to any guides or other machine parts contacting the latter surface.

Endless tapes sprayed with micronically fine synthetic graphite particles in Freon or Fluron in accordance with the method of the present invention have been run several hundred hours without substantial deterioration or tendency to tangle or stick.

Even though minute quantities of colloidal graphite will be transferred from one face to the opposite face of the tape during operation, the amount of graphite rubbed off the tape may be very small particularly if the graphite is of colloidal size and is deposited from solution. There is an affinity between the minute graphite particles and the tape which firmly holds the graphite film to the tape and defeats any tendency of removal even by the abrasive magnetic face of the tape although minute quantities may be transferred to said face in the manner described above after the tape has been used extensively. The larger non-colloidal particles are more apt to be rubbed off the tape, however.

By suspending the plate-like particles of graphite or other non-magnetic conducting material in a liquid carrier, the particles may be uniformly dispersed in the liquid and may be evenly applied by spraying or other methods of application throughout the entire length and width of the tape ribbon to form an electrically-conductive shingle-like film which is continuous throughout the length of the tape.

It is believed that an almost ideal film of graphite may be applied in this manner since the plate-like particles tend to assume positions parallel to the tape surface as they settle in the liquid and the surface tension on the liquid carrier during thereof tends to move the particles which are not substantially parallel to said surface into parallel positions. The overlapping plate-like particles tend to form a shingle-like film of generally uniform thickness which adheres strongly to the tape and which effectively carries electrostatic charges along the length of the tape to prevent the buildup of substantial charges between adjacent convolutions of the tape coil.

According to the present invention the particles of graphite applied to the tape are of colloidal size. It will be understood that the term "colloidal" as used herein designates micronically fine particles which are so small that, under normal conditions, they can remain dispersed and suspended in a liquid, such as water, gasoline or the like, for extended periods of time without settling out. Such particles normally have a particle size not substantially in excess of about 10 microns. Those particles having a diameter over 20 microns (.020 millimeter) are clearly non-colloidal and will rapidly settle out of a solution.

Non-colloidal graphite particles do not provide a satisfactory coating for magnetic tapes and a good coating usually cannot be obtained using graphite with an average particle size in excess of about ten microns. In general the results improve as the size of the particles applied to the tape decreases. According to the present invention preferably at least about ninety percent of the particles applied to the tape have a particle size not in excess of about ten microns (.001 millimeter) and the average particle size is preferably not in excess of about five microns. Results improve as the percentage of large particles decrease since the large particles do not adhere strongly to the tape, and good results can usually be obtained if none of the particles of graphite have a diameter over about ten microns. Better results are obtained when all the graphite has a particle size less than five microns, but it is sometimes desirable to use less expensive graphite which contains small amounts (say up to five or ten percent) of graphite with a larger particle size. Superior results can be obtained where the graphite applied to the tape has an average particle size not in excess of about two microns and at least about ninety percent of the particles have a particle size not in excess of about five microns, and best results can be obtained if all of the particles have a maximum diameter not in excess of about five microns.

Graphite particles can be screened to obtain the proper particle size. An almost ideal graphite film may be applied to the tape by spraying the tape with a solution containing graphite particles with an average particle size less than two microns. After a suitable screening, it is possible to obtain extremely fine graphite wherein about 90 to 95 percent has a particle size not in excess of 1½ microns and the remainder has a particle size not in excess of about three microns. Extremely fine graphite of this type when deposited on a tape from solution adheres very strongly to the tape and provides an ideal coating for the tape whether deposited on a magnetic-coated or uncoated face of the tape.

Synthetic graphite and natural graphite both have a plate-like structure and provide a shingle-like film when deposited from liquid. However, the synthetic graphite is easier to obtain in colloidal size. Although natural graphite cannot readily be ground to a colloidal size suitable for application to tape using ordinary commercial milling procedures, it provides the highest quality coating for the tape when it is milled or otherwise broken down to the size required by the present invention.

It will be understood that the term "particle size" as used herein refers to the maximum dimension or largest diameter of the particle.

*Example I*

A solution was prepared from fine colloidal synthetic graphite with an average particle size of about one micron, a minimum particle size of about 0.5 micron, and a maximum particle size of eight microns using isopropyl alcohol as the volatile carrier. The colloidal graphite has the property of not becoming agglomerated and therefore maintaining its small elemental particle size, which is not possible with ordinary commercially milled graphite.

Figure 4:
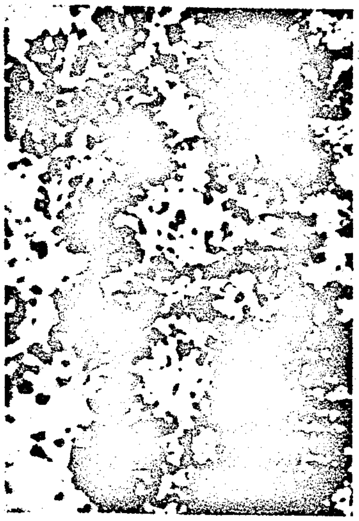
Figure 4 is a photomicrograph showing a portion of a plastic tape coated with colloidal graphite particles according to the method of the present invention.

The liquid solution was sprayed on Mylar 1.5 mil single-oxide-coated tape with a uniform width of one-quarter inch and evaporated to leave a thin, uniform and continuous film of minutely-divided graphite particles on the side of the tape uncoated with the magnetic oxide. A portion of this unused tape was then photomicrographed as shown in Fig. 4, the magnetic oxide being removed from the tape so as not to appear in the photomicrograph.

The remaining magnetic-coated tape was then tested before and after being subjected to wear and was employed in an endless tape coil on a high fidelity recording and reproducing device. It was found that the graphite coating adhered firmly to the tape during use, provided the tape with a low coefficient of friction, and permitted continuous use of the tape for long periods of time without binding of the convolutions of the spirally-wound endless tape coil.

The surface conductivity of the colloidal graphite film on the tape surface was determined before and after the tape had been subjected to friction and wear by placing spring-loaded electrical contacts across the surface of the one-quarter inch wide tape to measure the resistance to the flow of electrons. In the test the contacts were placed one inch apart on the graphite coated surface of the tape and an ohmeter was connected to the contacts to measure resistance. After evaporation of the liquid carrier and before being subjected to wear, the ¼ x 1 inch graphite film had a measured resistivity of about eight megohms and after being subjected to wear for a short time the measured resistivity was only about two megohms.

The tests indicated that the graphite film had an excellent surface conductivity and was almost ideal for preventing the buildings of static charges between the convolutions of a tape coil. Prolonged use of the tape on a high-fidelity tape recorder without binding of the tape and without "wow" due to variation in tape speed indicated that an ideal colloidal graphite film was provided using the method of this Example I. The graphite particles applied to the tape by spraying did not rub off to any great extent so as to reduce the effectiveness of the graphite film but adhered strongly to the tape even though a binder was not used to hold the graphite particles to the tape.

*Example II*

A solution was prepared with isopropyl alcohol and minutely divided synthetic graphite particles with an average diameter of about five microns, a minimum diameter of about 0.1 micron and maximum strays of 8 microns.

The solution was sprayed on Mylar 1.5 mil single-oxide coated tape and the resulting graphite coating was tested in the manner described in Example I. The photomicrograph of the resulting graphite film shown in Fig. 5 indicates that the graphite particles are more widely separated than in Example I. It should therefore be apparent that the unused tape of this Example 2 has poor surface conductivity.

Figure 5:
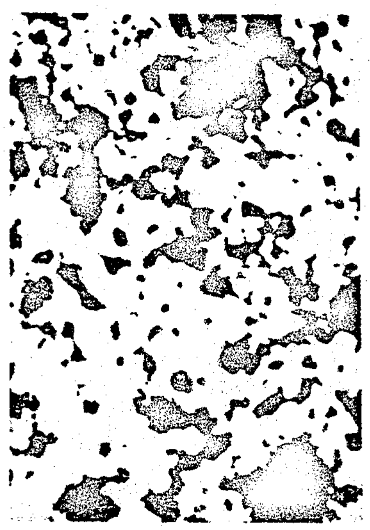
Figure 5 is a photomicrograph similar to that of Fig. 4 showing a coating with larger graphite particles therein.

The resistance test of Example I indicates that a ¼ x 1 inch graphite film deposited on the tape as indicated in this Example II has a resistivity of well over 1000 megohms before the tape is subjected to wear and while the graphite particles are spaced as shown in Fig. 5. However, the resistivity may be reduced below about 15 megohms by using the tape and subjecting it to wear so as to press the graphite particles together and create more conduction paths.

The larger particles of graphite employed in this example do not adhere to the tape as well as the particles employed in Example I, but provide a satisfactory coating for the tape. After moderate wear the graphite coating provides a low coefficient of friction comparable to that provided by the coating of Example I.

*Example III*

A solution is prepared from fine commercially-milled non-colloidal graphite whose particle size ranged from about 2 to 40 microns using carbon tetrachloride as a carrier.

Figure 6:
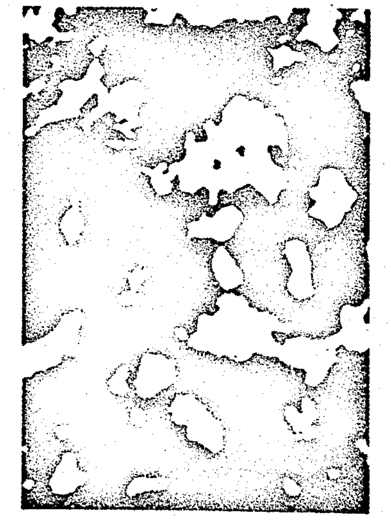
Figure 6 is a photomicrograph showing a coating containing large commercially-milled non-colloidal graphite particles.

The solution was sprayed on Mylar 1.5 mil single-oxide-coated tape with a uniform width of one-quarter inch and evaporated to leave a coating of finely divided graphite particles on the non-magnetic face of the tape. The resulting coating appears to be dense as shown in the photomicrograph of Fig. 6, but the very large particles do not make good contact with one another so as to provide an electrically conductive surface. Tests of the type described in Example I indicate that the resistivity of a ¼ x 1 inch portion of such graphite coating is well over 1000 megohms before and after the tape is subjected to substantial wear so that such coating cannot effectively prevent the buildup of static charges on the tape. However, the large graphite particles reduce the coefficient of friction substantially as well as the colloidal particles of Example I.

The large particles are undesirable since they do not adhere strongly to the tape. After the tape is used for a substantial period of time, most of these particles are rubbed off the tape. It has been found that the resistance to the flow of electrons along the tape may be increased as the tape is used due to the removal of the graphite particles from the tape instead of being decreased as in Example I.

*Example IV*

A solution is prepared from isopropyl alcohol and a blend of different sized graphite particles, two-thirds of the particles being colloidal graphite of the size employed in Example I and the remainder being commercial milled graphite of the size employed in Example III.

Figure 7:
Figure 7 is a photomicrograph showing a graphite coating similar to that shown in Fig. 4 but containing a minor proportion of commercially milled graphite of the type shown in Fig. 6.
Figure 8:
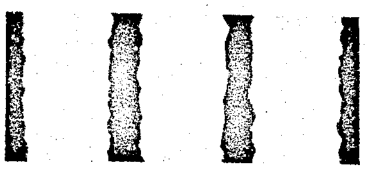
Figure 8 is a photomicrograph on the same scale as Figs. 4 to 7 and showing a plurality of lines each drawn so as to be spaced 10 microns from the next adjacent line.

The solution is sprayed on Mylar 1.5 mil single-oxide-coated tape and the tape is photomicrographed as in Example I, the resulting graphite film being shown in the photomicrograph of Fig. 7.

The graphite film adheres fairly well to the tape due to the large amount of colloidal size graphite, but the larger particles are easily rubbed off the tape. When first used, the coefficient of friction of the graphite coated surface of the tape is lower than in Example I, but after being in use for a short time the larger graphite particles are rubbed off and the coefficient of friction is substantially the same as in Example I.

The rubbing off of the larger particles results in an increase in the resistivity of the graphite surface. When tested as in Example I, a ¼ x 1 inch portion of the graphite film of this example has a resistivity of about 10 megohms before being subjected to wear and a resistivity of about 30 megohms after being subjected to wear for a short time so as to rub off a substantial amount of graphite.

Satisfactory results may be obtained when the tape of this Example IV is used in a tape recorder or playback machine, but the results are not as good as may be obtained with the tape of Example II and are not nearly as good as may be obtained with the tape of Example I.

In each of the above examples, the graphite coating is applied to the non-magnetic or uncoated side of the tape. Where the graphite coating is applied directly to the magnetic-coated face of the tape over the iron oxide particles, difficulty may be encountered due to separation between the oxide and the magnetic head of the tape recorder. Such separation can cause high frequency loss if it is excessive. With a 15 kilocycle constant-level signal at 7½ inches per second, a heavy graphite coating applied as in Example IV can cause about three decibels drop in sound level. However, the graphite coatings of Examples I and II do not cause a noticeable drop since they are very thin when applied to the magnetic coated face of the tape and do not cause substantial separation of the magnetic head from the magnetic oxide. It should therefore be apparent that colloidal graphite can provide a suitable coating for double-oxide-coated tapes.

It is to be understood that the above description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

Having described my invention, I claim:

1. In a synthetic plastic tape having a smooth magnetic surface and suitable for use in the form of an endless loop in sound reproducing and recording devices, the improvement which comprises having at least one face having a coating of graphite deposited from a liquid dispersion.

2. In a synthetic plastic tape having a smooth plastic surface and suitable for use in sound reproducing and recording devices, the improvement which compises having at least one face having a coating of graphite deposited from a liquid having graphite suspended therein, said coating being substantially uniform and continuous as evidenced by an electrical conductivity which is substantially constant from point to point.

3. A product according to claim 1 wherein the synthetic plastic tape is formed of an oriented polyethylene terephthalate.

4. A product according to claim 1 wherein said synthetic plastic tape is formed of cellulose acetate.

5. A product according to claim 1 wherein a major proportion of the graphite deposited from dispersion has a particle size of less than 10 microns.

6. A method of treating a magnetic recording tape having a continuous film of synthetic plastic with a smooth magnetic surface which comprises providing a volatile liquid carrier having minutely divided graphite particles dispersed therein, applying said carrier to at least one face of said tape, and drying said tape to leave a coating of graphite on said face.

7. A method as defined in claim 6 wherein said graphite particles have a colloidal particle size.

8. A method as defined in claim 6 wherein at least about ninety percent of said graphite particles have a particle size not in excess of about ten microns.

9. In a synthetic plastic tape having a smooth magnetic surface and suitable for use in the form of an endless loop in sound reproducing and recording devices, the improvement which comprises a coating of minutely divided graphite deposited from a fluid on at least one face of said tape and strongly adherent to the surface of the tape, said coating being substantially uniform and continuous when deposited on the tape, as evidenced by an electrical conductivity which is substantially constant from point to point.

References Cited in the file of this patent

UNITED STATES PATENTS

| | | |
|---|---|---|
| 2,003,564 | Thorpe | June 4, 1935 |
| 2,426,838 | Miller | Sept. 2, 1947 |
| 2,607,710 | Schmelzle | Aug. 19, 1952 |
| 2,697,671 | Brennan | Dec. 21, 1954 |
| 2,702,580 | Bateman | Feb. 22, 1955 |
| 2,749,490 | Robinson | June 5, 1956 |

FOREIGN PATENTS

| | | |
|---|---|---|
| 149,081 | Australia | Nov. 18, 1952 |

OTHER REFERENCES

Gwinn (Graphite—Natural and Manufactured), Dept. of the Interior Information Circular #7266 (Dec. 1943), page 14.